June 27, 1939.   J. E. ENGLUND   2,163,595
POWER TRANSMISSION MECHANISM
Filed Jan. 24, 1938   4 Sheets-Sheet 3
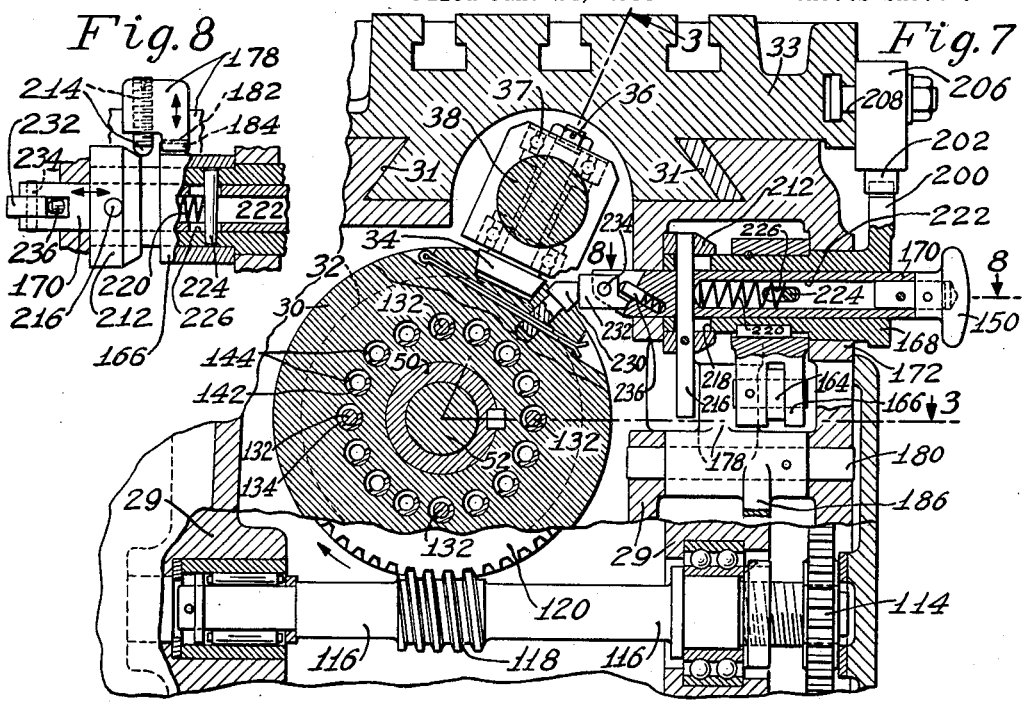
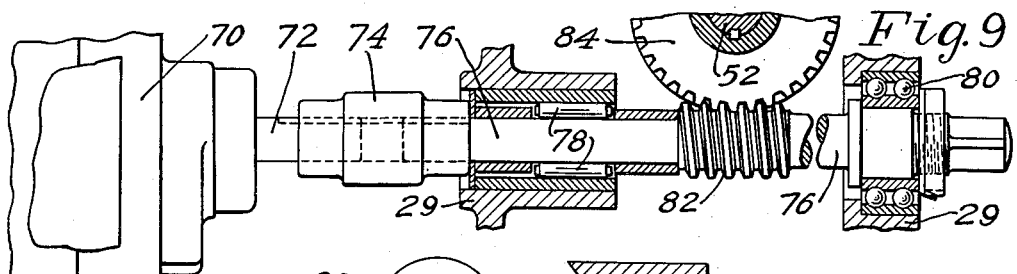
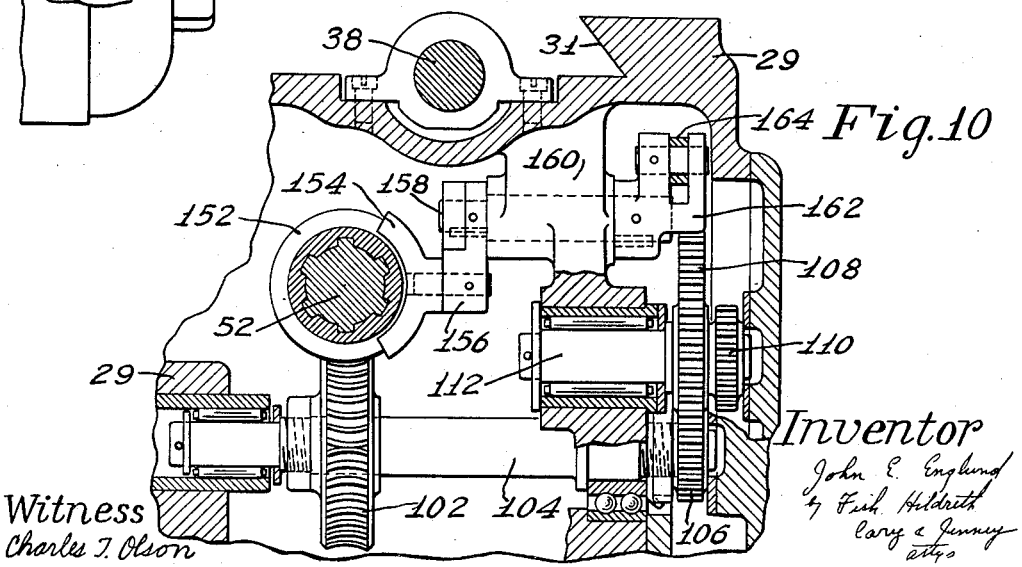
Witness
Charles J. Olson
Inventor
John E. Englund
by Fish Hildreth
Cary & Jenney
attys

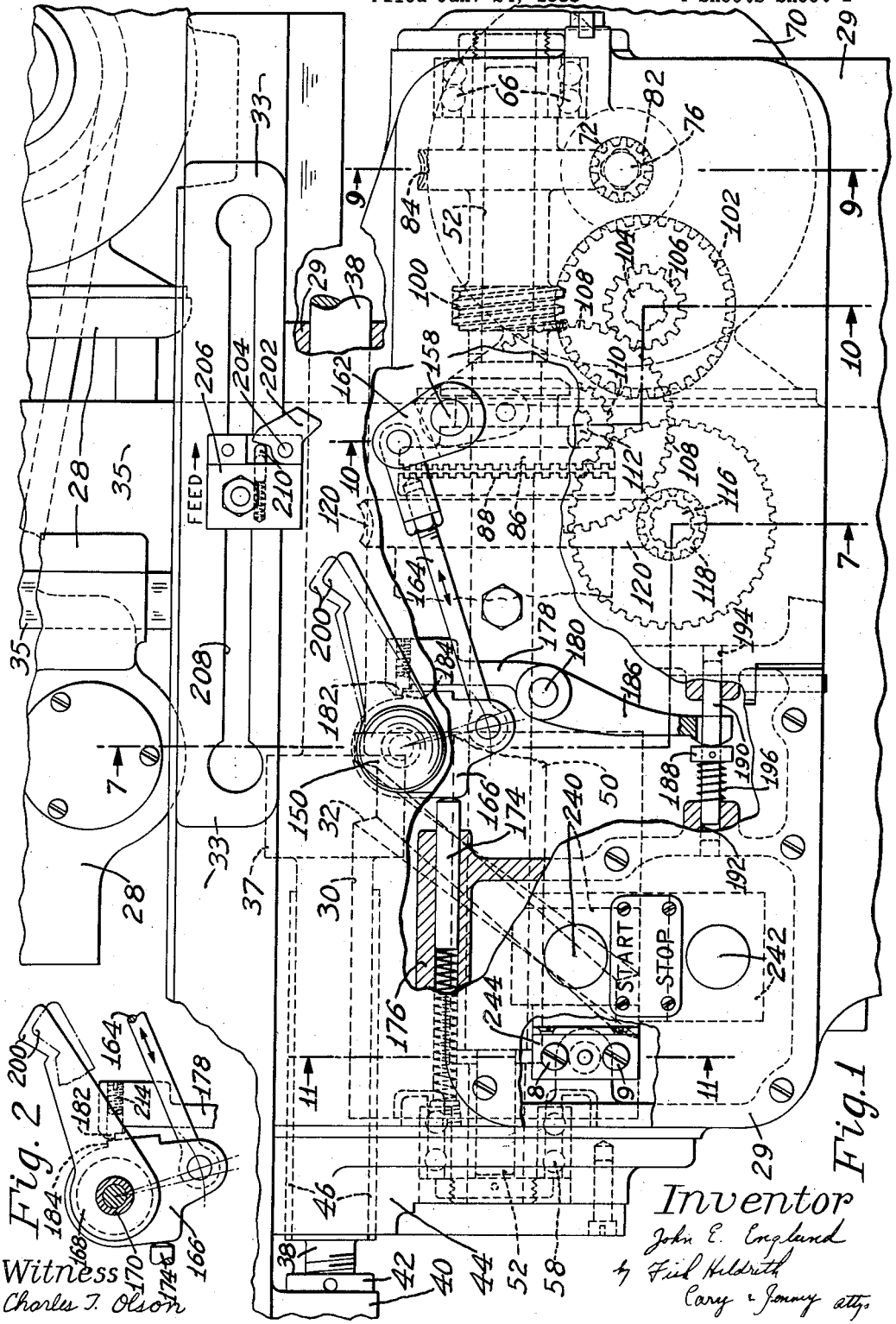

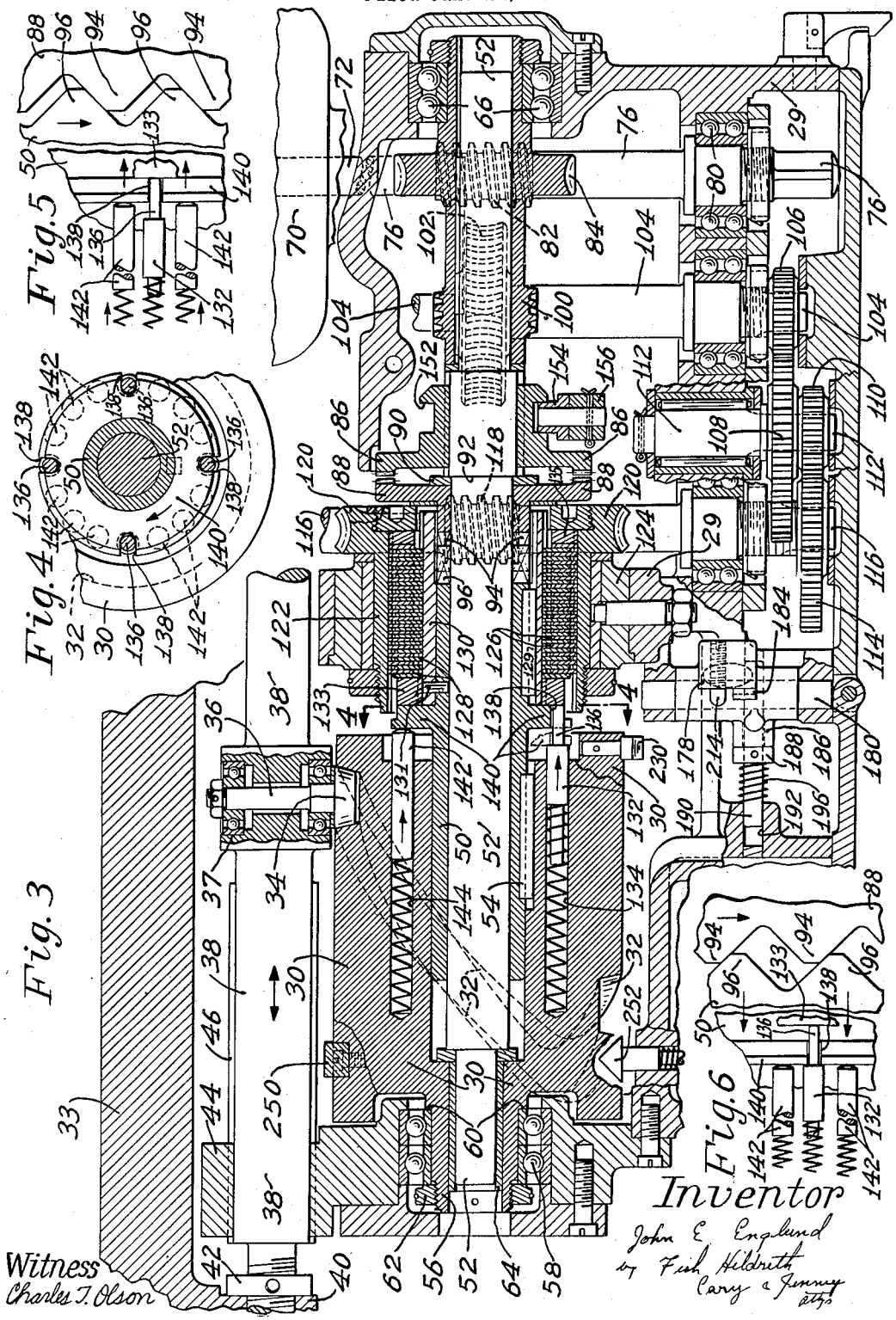

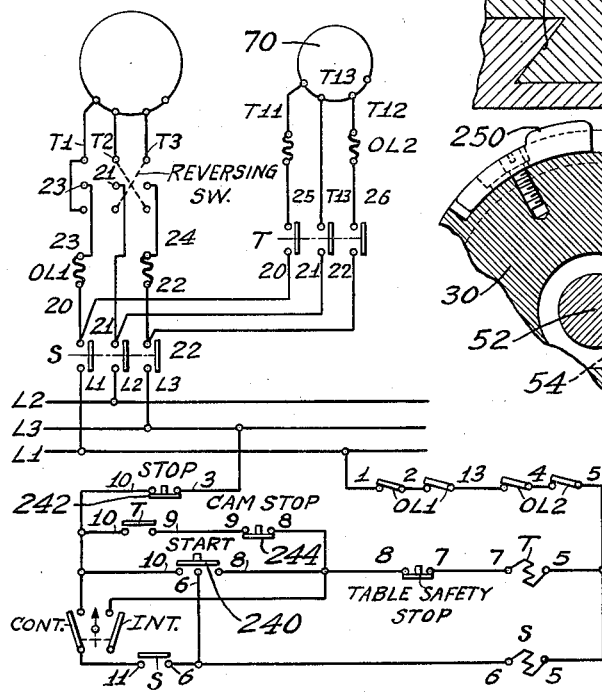
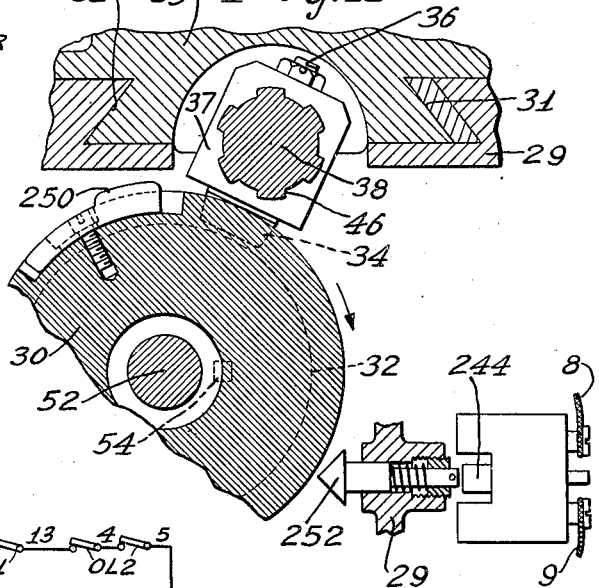
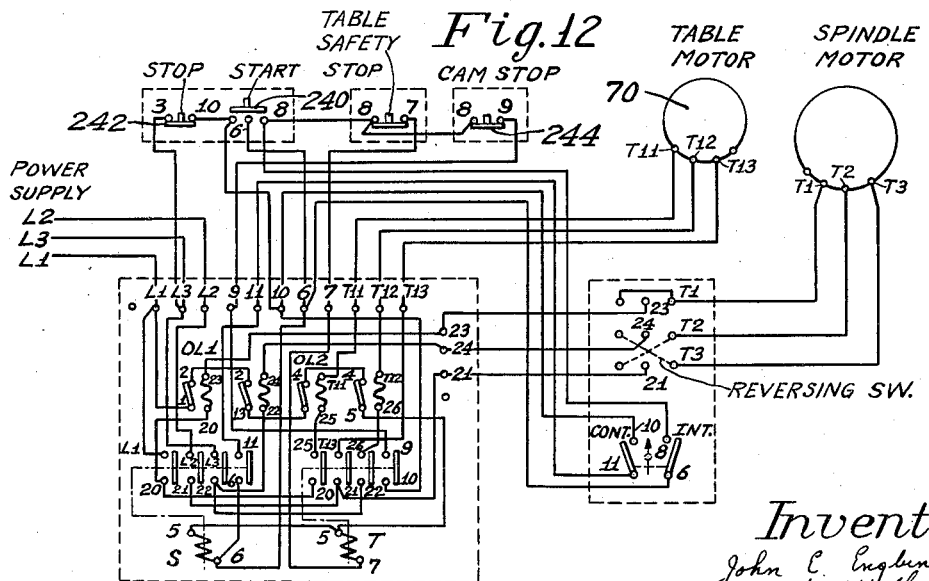

Patented June 27, 1939

2,163,595

UNITED STATES PATENT OFFICE 2,163,595

POWER TRANSMISSION MECHANISM

John E. Englund, Warwick, R. I., assignor to Brown and Sharpe Manufacturing Company, a corporation of Rhode Island Application January 24, 1938, Serial No. 186,575

20 Claims. (Cl. 192—145)

The present invention relates to improvements in power transmission mechanisms.

The invention is herein disclosed in a preferred form as embodied in a cam actuated milling machine of the manufacturing type having a transversely movable work supporting table, and a rotary cutter spindle supported for vertical adjustment toward and away from the table. The driving connections for the table include a cylindrical driving cam which is driven always in the same direction, and a follower carried on the table for engagement with a spiral feed and return cam track formed in the periphery of the driving cam. The drive for the table is taken from the electric motor through a transmission which includes a slow speed gear train, clutching means associated therewith, a high speed gear train, and high speed clutching means operable to effect an automatic shift of the rate of table drive from feed to traverse. The machine herein particularly described, is constructed and arranged for operation in accordance with an automatic cycle in which the table is moved from its start position at the fast or traverse rate, is slowed prior to the engagement of the cutter with the work, and is finally returned to its initial start and stop position at the faster rate.

It is a principal object of the invention to provide a novel and improved power transmission suitable for automatic control to cause the driven support to be stopped accurately and dependably in a desired stop position, and without excessive shock or jar to the operating parts.

It is another object of the invention to provide a power transmission of the general type having a slow speed driving element, a high speed driving element, and means for selectively connecting the drive for high speed or slow speed operation, which is capable of automatic control to effect an instantaneous shift from one driving rate to the other with a maximum efficiency and smoothness of operation.

It is more specifically an object of the invention to provide a driving mechanism of this general description, in which a novel operating relation is secured between the slow speed clutching means and the high speed over-driving connections associated therewith, which is adapted for automatic control to effect the shift from one to the other of the driving rates at the desired point in the table travel, and which is further operable in stopping the driven support from quick traverse to provide a braking resistance of substantially uniform value for bringing the table to stop in a predetermined position.

With these and other objects in view, as may hereinafter appear, the several features of the invention consist in the devices, combinations and arrangement of parts hereinafter described and claimed, which together with the advantages to be obtained thereby will be readily understood by one skilled in the art from the following description taken in connection with the accompanying drawings, in which Fig. 1 is a view in front elevation of a manufacturing type cam actuated milling machine, with a portion of the casing broken away, and certain of the underlying parts shown in section, to illustrate particularly the driving and controlling devices for the work supporting table; Fig. 2 is a detail view illustrating particularly the feed control lever shown in Fig. 1, in its raised or unlocked position in which the table is connected to be driven at a feed rate; Fig. 3 is a developed sectional view illustrating particularly the driving and control mechanisms for the work supporting table, taken on the line 3—3 of Fig. 7; Fig. 4 is a detail sectional view taken on the line 4—4 of Fig. 3, illustrating particularly the flange for controlling the operation of the slow feed friction clutch; Fig. 5 is a developed view showing in detail the cam tooth clutch and the spring plungers co-operating therewith for controlling the engaging pressure on the slow feed friction clutch, the parts being shown in slow feed position; Fig. 6 is a view similar to Fig. 5, but showing a different position of the parts in which the over-driving impulse of the high speed clutch has caused the pressure on the slow speed friction clutch to be reduced; Fig. 7 is a sectional view taken on the line 7—7 of Fig. 1, illustrating particularly the mechanisms for controlling the position of the high speed clutch; Fig. 8 is a detail view partly in section taken on the line 8—8 of Fig. 7; Fig. 9 is a detail sectional view taken on the line 9—9 of Fig. 1, and illustrating particularly certain of the driving connections from the table motor; Fig. 10 is a sectional view taken on the line 10—10 of Fig. 1, illustrating particularly the means for controlling the high speed clutch; Fig. 11 is a sectional view taken on the line 11—11 of Fig. 1, illustrating particularly the automatic motor stop control operative for stopping the machine at the completion of a cycle of operations; Fig. 12 is a diagram of the electrical control circuits for the machine, and discloses particularly the electrical connections for controlling the operation of the table motor; and Fig. 13 is a simplified schematic diagram of the electrical connections shown in Fig. 12.

The power transmission for the work supporting table of a cam actuated milling machine disclosed in the drawings as embodying in a preferred form the several features of applicant's invention, comprises a prime mover in the form of an electric motor, slow speed and traverse transmission trains connected to be continuously driven thereby, a friction drag clutch operatively connecting the slow speed train to drive the table, a quick traverse clutch for connecting the traverse train to drive the table at the faster rate, and a rotatable and axially movable connecting sleeve member through which the drive to the table is taken from both the slow speed and traverse transmission trains. The traverse clutch is operatively connected to the connecting sleeve member by means of continuously meshed co-operating cam toothed clutch members formed respectively on the sleeve member and on the driven element of the traverse clutch, the construction and arrangement of the cam teeth being such that a driving impulse imparted through the traverse clutch connections tends to impart an axial as well as rotational movement to the connecting sleeve member. This axial movement of the sleeve connecting member is in the first instance produced by the resistance to the over-drive of the connecting sleeve member which is operatively connected to the slow speed friction clutch, and takes place against the resistance of a number of compression spring plungers which serve to build up a minimum resisting torque to the over-drive of the sleeve connecting member at the faster rate. Continued axial movement of the sleeve connecting member causes this member to engage with and act upon a second series of compression spring plungers through which the engaging pressure is maintained on the plates of the friction clutch, to effect a partial reduction of the engaging pressure and consequent drag exerted by the plates of the friction clutch during traverse operation of the table.

With this construction and operation of the operating connections above set forth, it will readily be seen that any variations in the net load resistance upon the driving connections including the cam tooth clutch connection during high speed operation of the table, will be automatically compensated for by a corresponding variation in the engaging pressure and consequent drag exerted by the friction clutch members. Any increase of load resistance acting through the cam tooth clutch connection such, for example, as might be produced by an increase in the frictional resistance to the movement of the table on its ways, will be transmitted axially through the sleeve connecting member to effect a corresponding reduction of the engaging pressure acting upon the friction clutch, any decrease of such load resistance similarly acting through a reduction of the axially directed pressure upon the sleeve connecting member to correspondingly increase the frictional engaging pressure and consequent drag exerted by the plates of the friction clutch. When the machine is now stopped from high speed operation by the de-energizing of the table motor, this automatically adjusted load resistance will operate as a braking resistance to slow and stop the table in substantially the same position. Inasmuch as the over-run of the table may now be accurately determined, and is wholly independent of any variations which may exist in operating conditions, a relatively easy braking action may be employed to effect an accurate and dependable stopping of the table in the desired position.

Referring specifically to the drawings, the machine is provided with a base 29 having formed thereon ways 31 on which is mounted a longitudinally reciprocable work table 33. A column support 35 formed as an integral unit with the base 29 carries a vertically adjustable spindle head 29 which may have mounted thereon a horizontally extending milling cutter spindle of ordinary description (not shown).

The mechanism for driving the work supporting table 33 comprises a cam drum 30 continuously rotatable in one direction and having formed in the peripheral surface thereof a feed and return cam track 32 which receives a follower roll 34 connected to move with the work table 33. The follower 34 is supported on the lower end of a vertically extending pin 36 having a ball bearing support 37 in a longitudinally extending shaft 38 which is rigidly secured at the left hand end as shown in Figs. 1 and 3, to a depending bracket 40 by means of adjustable lock nuts 42 screw-threaded to the reduced end of the shaft 38. In order to maintain the shaft 38 and follower 34 in the proper angular position with relation to the driving cam drum 30, the shaft 38 is fitted to slide within a sleeve bracket 44 forming part of the base 29, and having a splined connection 46 with the shaft 38.

The cam drum 30 as best shown in Fig. 3 is carried on a connecting member 50 which takes the form of a sleeve loosely supported for rotational and axial movement upon a high speed drive shaft 52. A key 54 connects the drum 30 to turn with the sleeve 50 while permitting axial movement of the sleeve with relation thereto. At one end the cam drum 30 is further provided with a reduced end portion 56 which is externally supported by means of ball bearings 58 carried by the stationary bracket 44. The bearing 58 engaging between a shoulder 60 and a lock nut 62 on the reduced portion 56, serves also to support the drum 30 against axial movement on the base 29. The high speed drive shaft 52 is rotatably supported at one end by means of a bushing 64 within the reduced portion 56 of the drum 30, and at its other end by means of a bearing 66 carried on the base 29.

The cam drum 30 is connected to be driven from a table motor 70 through driving connections which include a high speed driving train and a slow speed driving train. As best shown in Figs. 1, 3 and 9 of the drawings, the rotor shaft 72 of the motor 70 is connected through a coupling 74 to a cross shaft 76 which is supported in bearings 78 and 80 in the base 29, and has formed thereon a worm 82 meshing with a worm gear 84 on the high speed drive shaft 52. The shaft 52 may be connected to drive the cam drum 30 at the relatively faster rate through connections which include a high speed clutch member 86 keyed to turn with the shaft 52, and movable axially into engagement with a driven high speed clutch member 88 which is loosely sleeved to turn on the shaft 52, and supported against axial movement to the right as shown in Fig. 3, by means of a collar 90 supported against a shouldered portion 92 of the high speed shaft 52. The clutch member 88 is connected to drive the connecting sleeve member 50 by means of a continuously engaging clutch comprised by cam teeth 94 formed on the hub portion of the clutch member 88 which are arranged to be continuously meshed with corresponding cam teeth 96 formed on the adjacent end of the connecting sleeve member 50.

The cam drum 30 is alternatively driven at a relatively slow rate through a branch transmission which comprises a worm 100 on the high speed drive shaft 52 which meshes with a worm gear 102 on a cross shaft 104. The drive is taken from the shaft 104 through a gear 106 which meshes with one of two pick-off gears 108 and 110 carried by a stub shaft 112, the other of said gears meshing with a gear 114 on a cross shaft 116. A worm 118 mounted on the shaft 116 meshes with a slow speed worm wheel 120 which is mounted coaxially with the shaft 52 and connecting sleeve member 50, being rigidly secured to a multiple disk friction clutch sleeve member 122 which is externally supported in a bearing 124 in the base 29. The clutch sleeve 122 has splined to the inner periphery thereof, a number of friction clutch disks 126 arranged for engagement with cooperating disks 128 similarly splined to a cooperating friction clutch member 130 which takes the form of a sleeve rigidly secured to the connecting sleeve member 50 by means of a key 129 and locking pin 131. The disks 126 and 128 are supported to move freely in an axial direction with relation to the sleeves 122 and 130 to permit the engagement and slipping of the friction clutch. In order to prevent possible disengagement of the plates 126 and 128 from their respective splines due to the axial movement of the sleeve connecting member 50 and sleeve 130, the end plates of the friction clutch take the form of two relatively wide collars 133 and 135, the collar 133 being splined to the clutch sleeve 130, and the collar 135 at the opposite end of the series being splined to the sleeve 122.

The clutch disks 128 and cooperating disks 126 are normally forced to the right against the adjacent face of the worm gear 120 in clutching engagement with one another, as shown in Fig. 3, by means of four spring-pressed plungers 132 which are supported in axially extending bores 134 spaced 90° apart in the cam drum 30 for engagement with the collar 133. As best shown in Figs. 3 and 4, each of these spring pressed plungers 132 is provided with a reduced portion 136 passing through a corresponding slot 138 formed in the periphery of a flange 140 on the sleeve connecting member 50, so that movement of the sleeve member 50 and flange 140 to the left from the position shown in Fig. 3, will operate by the engagement of the flange 140 with the shouldered end of the reduced portion 136 to reduce the frictional engaging pressure of the slow feed friction clutch. During slow speed operation of the table when the high speed clutch 86 is disengaged, the sleeve connecting member 50 is maintained in inoperative position to the right, in which the flange 140 is out of engagement with the shouldered portions of the plungers 132, and in which the cam teeth 94 and 96 are more nearly seated with relation to one another, as shown in Fig. 5, by the action of twelve spring plungers 142 seated in axially extending bores 144 formed in the cam drum 30 for continuous engagement with the flange 140 of the sleeve connecting member 50.

The operation of the connections for controlling the operation of the slow feed friction clutch during the various phases of the operating cycle of the machine, may be briefly described as follows:—

Assuming that the fast feed clutch 90 is disconnected and the table 33 is being driven at the slower feed rate to the right, the position of the several cooperating mechanisms will be as shown in Fig. 3. The sleeve connecting member 50 is held to the right by the spring plungers 142, the cam teeth 94 and 96 being deeply meshed as shown in Fig. 5. The flange 140 is in its position to the extreme right, so that the spring plungers 132 are permitted to apply a maximum engaging pressure upon the members of the slow speed friction clutch. The spring plungers 142 for this position of the parts, are at zero tension, the flange 140 being preferably seated against the collar 133, so that any shock or jar to the mechanism which might otherwise result when the sleeve connecting member 50 is permitted to move to the right upon disengagement of the high speed clutch 90 will be absorbed by the cooperating clutch members 126, 128.

When the table reaches the limit of its movement to the right, this being substantially the position shown in Fig. 3, the fast feed clutch 86 is shifted into driving engagement with the driven clutch member 88 which acts through the engaging cam clutch teeth 94, 96 to impart a positive over-driving impulse to the sleeve connecting member 50. The resistance to the over-drive of the connecting member 50 with relation to the feed worm wheel 120 acting through the slow feed friction clutch, causes the clutch teeth 96 to ride outwardly on the cammed surfaces of the teeth 94, shifting the connecting member 50 with the flange 140 to the left against the pressure of the spring plungers 142. This movement of the connecting member 50 continues until the flange 140 is brought into engagement with the shouldered portions of the spring plungers 132. A condition of equilibrium is now obtained in which the further increase of the load resistance through the cam tooth clutch connection 94, 96 will operate by increasing the force of the axial thrust of the sleeve member 50 to correspondingly reduce the engaging pressure exerted by the spring plungers 132 on the friction clutch plate members 126, 128, thus reducing the load resistance produced by the drag of the friction clutch members. Similarly, any reduction of the load resistance acting through the cam tooth clutch connection 94, 96 will operate by decreasing the force of the axial thrust of the sleeve member 50 to permit a corresponding increase of the frictional engaging pressure on the members of the friction clutch.

In the construction above set forth, the slow speed friction clutch will operate in stopping the machine from quick traverse, to provide a braking resistance which is maintained automatically at a uniform value to cause the table to stop always with substantially the same amount of over-run, and with substantially a given number of revolutions of the table motor after the circuit thereto is opened. The braking torque which is effective to stop the table, is produced chiefly by the resistance of the table ways and the drag on the friction clutch. As above pointed out, this resistance acting through the cam tooth clutch connection 94, 96, will be maintained at a substantially constant value until the parts have been brought to a full stop.

The construction above described, is of considerable value to insure an accurate stopping of the work table from quick traverse operation at the end of its automatic cycle. Inasmuch as the amount of the over-run of the table after the motor has been disconnected, depends entirely upon the amount of the braking resistance which, as above pointed out, is maintained at a uniform value, a relatively light braking action with a correspondingly long table over-run may be employed to insure an even and effortless braking of the table to a stop without loss of accuracy or dependability of the mechanism to stop the table in the desired position. Such a braking torque while constantly present during high speed operation of the table, need not be sufficiently great to cause undue wear in the operating mechanism, or excessive loss of power.

Applicant's construction has the further advantage that the shift of the quick traverse clutch to its disconnected slow speed position, will operate instantaneously and without shock or jar on the parts, to slow the table to the feed rate. It will readily be seen that when the traverse clutch 86 is disconnected from the driven member 88, the driving torque maintained through the cam tooth clutch connections 94, 96, instantly disappears, allowing the sleeve member 50 to move to the right under the pressure of the spring plungers 142, and allowing the spring plungers 132 to exert the maximum engaging pressure upon the friction clutch plates 126, 128. The position of these parts during operation at the feed rate, is shown in Fig. 5. The improved operation of applicant's mechanism which operates to effect the shift from traverse to feed without any possibility of over-running by the table at the traverse rate, makes possible the close setting of the machine controls to effect the slowing of the table to the feed rate at the last possible moment prior to the engagement of the cutter with the work, and thus prevents loss of time in bringing the table into position for the beginning of the milling operation.

The slow speed friction clutch and the connections associated therewith including the cam tooth clutch members 94 and 96 for effecting the over-drive of the cam drum 30 at the higher speed rate, are constructed and arranged to permit slippage of the driving connections in the event of overloading during operation of the table at either rate. In order to permit such a yield in the slow speed driving connections, the spring plungers 132 are arranged to maintain a frictional engaging pressure between the clutch disks 126 and 128 which, while sufficient to maintain an unyielding driving connection through the friction clutch under ordinary operating conditions, will permit slippage between the cooperating friction disk members 126 and 128 in the event that the driving connections are subjected to any unusual strain or over-load during operation.

In order that the high speed driving connections may be similarly disconnected in the event of over-load during operation at the higher speed rate, the sleeve member 50 is constructed and arranged for axial movement to the left (see Fig. 3) a sufficient distance to wholly disengage the cam tooth clutch members 94 and 96. Under normal conditions of high speed operation, the connecting sleeve member 50 will be moved to the left only far enough to relieve the engaging pressure of the spring plungers 132 upon the slow speed clutch disks 126 and 128, the pressure exerted by the plungers 142 and 132 being then sufficient to prevent further relative movement of the cam tooth surfaces 94 and 96 from the high speed driving position illustrated in Fig. 6. However, if any excessive strain is thrown on the driving connections, the resulting increase of load on the came tooth clutch members 94 and 96 will cause the connecting sleeve member 50 to be moved still further to the left beyond its usual operating position against the pressure of the spring plungers 142 and 132, thus operatively disconnecting the high speed drive.

The operation of the high speed clutch 86 may be controlled automatically by movement of the table and associated parts, through the operation of an adjustable table dog and a trip member carried by the cam drum 30, or manually if so desired, through the operation of an axially movable manual control knob 150. As best shown in Figs. 1 and 10 of the drawings, the clutch member 86 has formed in the sleeve hub thereof, an annular groove 152 which is adapted to receive a shoe 154 carried on a clutch shifting lever 156 secured to a rock shaft 158 which is journalled in a bearing 160 in the base, and has secured to the opposite end thereof, an upwardly extending lever arm 162. The lever arm 162 is connected by a link 164 with a downwardly extending arm 166 keyed to a sleeve member 168 (see Figs. 7 and 8) which is supported upon an axially movable control pin or plunger 170, to the forward end of which is secured the manual control knob 150 above mentioned. The sleeve member 168 is externally supported to permit rotational movement thereof, in a bearing 172 in the machine frame. The sleeve member 168 and lever arm 166 are acted upon by means of a spring-pressed plunger 174 which is supported in a bracket 176 on the machine frame, and tends to turn the lever arm 166 in a counterclockwise direction as shown in Fig. 1, to move the high speed clutch 86 to its closed or high speed position. In order to maintain the clutch 86 in its slow speed position against the pressure of the spring-pressed plunger 174 when so desired, a latch mechanism is provided comprising a latch lever arm 178 pivotally supported intermediate its length on a pivot pin 180, and provided at its upper end with a latch 182 for engagement with a corresponding abutment 184 on the hub portion of the lever 166. The latch lever 178 is tensioned in a counterclockwise direction for engagement with the abutment 184 by means of connections which include a downwardly extending lever arm 186 rigidly secured to turn with the latch lever 178. The lever 186 at its lower end is engaged against a collar 188 secured to a spring-pressed plunger 190 which passes through the bifurcated lower end of the lever 186, and is supported at opposite ends in recesses 192 and 194 in the machine frame. A tension spring 196 coiled about the plunger 190 between the collar 188 and a portion of the machine frame, serves to tension the lever arm 186 and latch lever 178 in a counterclockwise direction as shown in Fig. 1.

For automatic operation of the clutch 86, two mechanisms are provided, one being employed to shift the clutch to its disengaged or slow feed position, and the other being employed to shift the clutch to its closed or high speed position. The first of these mechanisms comprises a dog actuated feed lever arm 200 which is rigidly secured to turn with the sleeve member 168 and clutch control lever 166, and is arranged to be acted on by a table dog 202 to move the clutch 86 to open position against the pressure of the spring plunger 174, and to permit the engagement of the latch 182. The dog 202 is carried on a pivot pin 204 on a supporting member 206 which is adjustably supported in a T-shaped slot 208 on the front side of the table 33. The dog 202 is so shaped as to be held rigidly in position when brought into engagement with the lever 200 during movement of the table 33 in the direction of feed, but is capable of being brushed aside during the movement of the table in a reverse or return direction. A light spring-pressed plunger 210 serves to maintain the dog 202 in operating position.

The second control mechanism for actuating the clutch 86 consists in a trip mechanism for releasing the latch 182, so that the clutch is permitted to move into its closed high speed position under the influence of the spring-pressed plunger 174. This trip mechanism consists of a beveled cam ring 212 which is slidably supported for movement lengthwise upon the sleeve 168, and is arranged to be brought into engagement with an adjustable trip pin 214 on the latch lever 178. The ring 212 is operatively connected with the rod 170 by means of a cross pin 216 which passes through a slotted portion 218 of the sleeve 168. The shaft 170 and cam ring 212 are normally maintained in a retracted inoperative position by means of a compression spring 220 which is supported in a central bore 222 in the shaft 170, and engages at its forward end against a cross pin 224 rigidly secured to the sleeve member 168 and extending through a slotted portion 226 of the shaft 170. The shaft 170 and cam ring 212 are moved outwardly to trip the latch 182, and thereby to shift the clutch 86 to its high speed position by means of a trip pin 230 which, as best shown in Figs. 3 and 7, is mounted on the peripheral surface of the cam drum 30, and is arranged to engage with a dog 232 pivotally supported by a pin 234 on the inner end of the shaft 170. The dog 232 is constructed and arranged to be maintained rigidly in position when acted upon by the trip pin 230 moving in a clockwise direction as shown, for example, in Fig. 7, but may be brushed aside if contacted by the trip pin 230 when moved in an opposite or counterclockwise direction. A spring-pressed plunger 236 acts to maintain the dog 232 in operating position.

The starting and stopping of the table 33 is controlled through electrical connections which are operative to start and stop the table motor 70. The electrical connections for the machine are illustrated in Figs. 1, and 11 to 13 inclusive, and will be described only so far as is believed necessary to indicate the operation thereof to start and stop the table 33. The controls for starting and stopping the table include specifically a start switch 240, a manual table stop switch 242, and a cam stop switch 244. As best shown in Fig. 13, the pressing of the table start switch 240 closes contact 10—8 energizing the relay coil T to close the table switch, thus starting the table motor in operation. Contactor 10—9 closes forming an interlock to maintain coil T energized. Simultaneously, starting contact 10—6 closes energizing relay coil S to close the spindle motor switch, and contactor S 11—6 closes forming an interlock to maintain coil S energized. The motor 70 continues in operation during one complete revolution of the cylindrical cam 32, during which time the table will have moved to the right, and then again to the left in accordance with the automatic operating cycle above set forth. As the table again approaches its starting position, a cam 250 (see Fig. 11) on the periphery of the cylindrical cam drum 30, will be brought into engagement with a spring-pressed plunger 252 causing this plunger to be depressed to actuate the cam stop switch 244. The cam stop switch contact 9—8 opens de-energizing coil T, and allowing the table switch to move to open position. Inasmuch as the table during its return movement to starting position, is operating at the quick traverse rate, the de-energizing of the table motor 70 will cause the braking torque imposed on the high speed connections by the compensating action of the cam tooth clutch connection 94, 96 and the slow speed friction clutch plate members 126, 128 as above described, to become effective for stopping the table accurately and dependably in the desired stop position.

It will be understood that the invention is not limited to the specific embodiment shown, and that various deviations may be made therefrom without departing from the spirit and scope of the appended claims.

What is claimed is:

1. In a power transmission mechanism, the combination of a driven element and a driving element, means for connecting and disconnecting the driving element from power operation to start and stop the driven element, means for maintaining a resisting torque of substantially uniform value in said transmission mechanism including means for imposing a drag resistance upon said transmission mechanism, and means responsive to variations in the resisting torque to effect compensatory variations in the amount of said drag resistance, whereby a braking resistance of substantially uniform value is maintained in stopping to produce an over-run of the driven element of a predetermined constant amount.

2. In a power transmission mechanism, the combination of a driven element, a driving element, means for connecting and disconnecting the driving element from power operation to start and stop the driven element, means for maintaining a resisting torque of substantially uniform value between the driving and driven elements including means for imposing a drag resistance upon said driving element, and means responsive to variations in the resisting torque to effect compensatory variations in the amount of said drag resistance, whereby a braking resistance of substantially uniform value is maintained in stopping to produce an over-run of the driven element of a predetermined constant amount.

3. In a power transmission mechanism, the combination of a driven element, a driving element, means for connecting and disconnecting the driving element from power operation to start and stop the driven element, intervening connections between the driving and driven elements including means for imposing a drag resistance upon the driving element, means for varying the intensity of said drag resistance, and means responsive to variations in the load resistance acting upon said driving element including said drag resistance to effect compensating variations in the intensity of said drag resistance, whereby a braking resistance of substantially uniform value is maintained in said connections in stopping to produce an over-run of the driven element of a predetermined constant amount.

4. In a power transmission mechanism, the combination of a driven element, a slow speed driving element, a high speed driving element, means for driving and for simultaneously disconnecting both of said driving elements from power operation, means including a drag clutch connecting the slow speed driving element to the driven element, means for varying the intensity of the drag exerted by said clutch, means for clutching the high speed driving element to drive the driven element, and means responsive to variations in resisting torque including the resistance of said drag clutch to effect compensating variations in the intensity of the clutch drag, whereby a braking resistance of substantially uniform value is maintained in stopping from high speed operation to produce an over-run of the driven element of a predetermined constant amount.

5. In a power transmission mechanism, the combination of a driven element, a slow speed driving element, a high speed driving element, means for driving and for simultaneously disconnecting both of said driving elements from power operation, means including a drag clutch connecting the slow speed driving element to the driven element, means for varying the intensity of the drag exerted by said clutch, means for clutching the high speed driving element to drive the driven element, and means responsive to the reaction between said slow and high speed driving elements acting respectively through said drag clutch and clutching means operative upon engagement of said clutching means first to build up a minimum load resistance to the drive through said clutching means, and thereafter to reduce the intensity of said drag resistance, said means being further responsive to variations in the load resistance acting through said clutching means to effect compensatory variations in the intensity of said drag resistance, whereby a braking resistance of substantially uniform value is maintained in stopping from high speed operation to produce an over-run of the driven element of a predetermined constant amount.

6. In a power transmission mechanism, the combination of a driven element, a slow speed driving element, a high speed driving element, means for continuously driving each of said driving elements, a friction clutch for operatively connecting the slow speed driving element with the driven element, pressure exerting means for engaging said friction clutch, means for clutching the high speed driving element to drive the driven element, and means responsive to the reaction between said slow and high speed driving elements acting respectively through said friction clutch and clutching means to relieve the frictional engaging pressure upon said friction clutch.

7. In a power transmission mechanism, the combination of a driven element, a slow speed driving element, a high speed driving element, means for continuously driving each of said driving elements, a friction clutch for operatively connecting the slow speed driving element with the driven element, pressure exerting means for engaging said friction clutch, means for clutching the high speed driving element to drive the driven element, and means responsive to the over-driving impulse of said high speed driving element acting through said clutching means against said friction clutch to reduce the friction engaging pressure of the friction clutch, and further responsive to any variation in the load resistance to said over-driving impulse to effect compensating variations in said friction engaging pressure whereby said load resistance is maintained at a substantially constant value.

8. In a power transmission mechanism, the combination of a driven element, a slow speed driving element, a high speed driving element, means for continuously driving each of said driving elements, a friction clutch for operatively connecting the slow speed driving element with the driven element, pressure exerting means for engaging said friction clutch, means for clutching the high speed driving element to drive the driven element, means including a cam tooth driving connection between said high speed driving element and the driven element responsive to the over-driving impulse of said high speed driving element acting through said clutching means to reduce the frictional engaging pressure upon the friction clutch, and further responsive to any variation in load resistance to said over-driving impulse to effect compensating variations in said friction engaging pressure whereby said load resistance is maintained at a substantially constant value.

9. In a power transmission mechanism, the combination of a driven element, a slow speed driving element, a high speed driving element, means for driving and for simultaneously stopping both of said driving elements, a friction clutch for operatively connecting the slow speed driving element with the driven element, pressure exerting means for engaging said friction clutch, means for clutching the high speed driving element with the driven element, means responsive to the overdriving impulse of said high speed driving element acting through said clutching means against the friction clutch to reduce the frictional engaging pressure of the friction clutch, and further responsive to any variation of load resistance to said over-driving impulse in stopping said elements to effect compensating variations of said engaging pressure whereby a braking resistance of substantially uniform value is maintained to produce an over-run of the driven element of a predetermined constant amount.

10. In a power transmission mechanism, the combination of a driven element, a slow speed driving element, a high speed driving element, a prime mover and connections therefrom operative for simultaneously driving and stopping both of said driving elements, a friction clutch for operatively connecting the slow speed driving element with the driven element, pressure exerting means for engaging said friction clutch, means for clutching the high speed driving element with the driven element, and a connection intermediate between the driven element and each of said slow speed and high speed driving elements responsive to the over-driving impulse of said high speed driving element acting through said clutching means against the friction clutch to relieve the frictional engaging pressure of the friction clutch, and operative in stopping the driven element from high speed operation to effect variations in said engaging pressure compensating for variations in load resistance whereby a braking resistance of substantially uniform value is maintained to produce an overrun of the driven element of a predetermined constant amount.

11. In a power transmission, the combination of a rotatable driven element, rotatable slow speed and high speed driving elements supported co-axially therewith, a connecting member keyed to turn with and axially movable with relation to said driven element, cooperating friction clutch members supported respectively by the connecting member and the slow speed driving element, spring means for exerting a frictional driving pressure between said friction clutch members, means controlled by axial movement of the connecting member to relieve the frictional engaging pressure exerted by said spring means, means for clutching the high speed driving element to drive the driven element, and driving connections between the high speed driving element and the connecting member comprising complementary cam toothed members continuously meshed in driving relation whereby an over-driving impulse imparted from the high speed driving element to the connecting member will force the connecting member axially to relieve the friction engaging pressure of the friction clutch surfaces.

12. In a power transmission, the combination of a rotatable driven element, rotatable slow speed and high speed driving elements supported co-axially therewith, a connecting member keyed to turn with and axially movable with relation to said driven element, a friction clutch for operatively connecting the slow speed driving element with the driven element comprising a driving clutch member associated with the slow speed driving element and a cooperating driven clutch member keyed to and axially shiftable with relation to the connecting member, spring means for exerting an axially directed clutch engaging pressure upon said latter friction clutch member, means controlled by axial movement of the connecting member in one direction to relieve the engaging pressure exerted by said spring means, spring means acting upon said connecting member to move the same axially in an opposite direction, means for connecting the high speed driving element to drive the driven element, and driving connections between the high speed driving element and the connecting member comprising a driving cam toothed member and a complementary cam toothed member formed integrally with the connecting member for continuous driving engagement therewith whereby an over-driving impulse imparted from the high speed driving element to the connecting member will move the connecting member axially against the pressure of said latter spring means, and then to relieve the friction clutch engaging pressure exerted by said first-mentioned spring means.

13. In a power transmission, the combination of a rotatable driven element, rotatable slow speed and high speed driving elements supported co-axially therewith, a connecting member connected to turn with and axially movable with relation to said driven element, a friction clutch for operatively connecting the slow speed driving element with the driven element comprising friction clutch members associated respectively with the connecting member and with the slow speed driving element, spring means for exerting a frictional driving pressure between said friction clutch members, means controlled by axial movement of the connecting member to relieve the frictional engaging pressure exerted by said spring means, means for clutching the high speed driving element to drive the driven element including a driven high speed clutch member supported co-axially with the connecting member, said clutch member and connecting member having cam teeth continuously meshed in driving relation whereby a relative rotational movement of the connecting member and said driven clutch member produced by the clutching of the high speed driving element thereto, will force the connecting member axially to relieve the frictional engaging pressure of the friction clutch members.

14. In a power transmission, the combination of a rotatable driven element, rotatable slow speed and high speed driving elements supported co-axially therewith, a connecting member connected to turn with and axially movable with relation to said driven element, a friction clutch for operatively connecting the slow speed driving element with the driven element comprising a friction clutch element supported to turn with the slow speed driving element and a cooperating friction clutch member keyed to and axially shiftable with relation to the connecting member, spring means for exerting an axially directed clutch engaging pressure upon said latter friction clutch member, means controlled by axial movement of the connecting member in one direction to relieve the engaging pressure exerted by said spring means, separate spring means acting upon said connecting member to move the same axially in an opposite direction, means for clutching said high speed driving element to drive the driven member including a driven high speed clutch member supported co-axially with the connecting member, and continuously meshing cam teeth connecting the driven clutch member and connecting member in driving relation whereby a relative rotational movement of the connecting member and said driven clutch member produced by the clutching of the high speed driving element will move the connecting member axially against the pressure of said latter spring means, and then to reduce the friction clutch engaging pressure exerted by said first-mentioned spring means.

15. In a power transmission mechanism, the combination of a driven element, a main stem transmission and slow speed and high speed branch transmissions connected to be continuously driven thereby, means for starting and stopping the main stem transmission to start and stop the driven element, a friction clutch for operatively connecting the slow speed branch transmission to the driven element, pressure exerting means for engaging said friction clutch, means for clutching the high speed branch transmission to the driven element, a driving connection between said clutching means and driven element including continuously meshed complementary relatively rotatable and axially displaceable cam tooth members, spring means acting to move said cam tooth members relatively toward each other, and means rendered operative by relative axial movement of said cam tooth members away from one another produced by relative rotational movement thereof to relieve the engaging pressure upon said friction clutch.

16. In a power transmission, the combination of a high speed drive shaft, a high speed driving gear on said shaft, a connecting member loosely sleeved on said shaft, a rotatable driven member keyed to the shaft and arranged to permit axial movement of the sleeve relatively thereto, a slow speed driving gear loosely supported by said sleeve, a multiple disk friction clutch comprising a friction clutch element supported to turn with the slow speed gear, and a driven friction clutch element keyed to turn with and slidable axially of said sleeve connecting member, spring means supported by the driven member and arranged to exert an axially directed clutch engaging pressure upon said driven friction clutch element, means controlled by axial movement of the sleeve connecting member in one direction to relieve the engaging pressure exerted by said spring means, separate spring means supported by the driven member and acting upon the sleeve connecting member to move the same axially in an opposite direction, and means for clutching the high speed gear and shaft to drive the driven member including a high speed driven clutch member secured to the shaft, continuously meshing cam teeth connecting said driven high speed clutch member and the sleeve connecting member in driving relation whereby a relative rotational movement of the sleeve connecting member and the high speed clutch member produced by the clutching of the high speed gear and shaft thereto will move the sleeve connecting member axially against the pressure of said latter spring means, and then to reduce the friction clutch engaging pressure exerted by said first-mentioned spring means.

17. In a milling machine having a reciprocable table, a driven element continuously rotatable in one direction to effect the reciprocatory movement of the table, a prime mover, a two-speed transmission mechanism connecting the prime mover to the driven element, and means for controlling the starting and stopping of the prime mover and the shifting of said transmission mechanism in accordance with an automatic cycle including fast and slow speed movements of the table in one direction, and a fast speed return movement to initial stop position, said transmission mechanism comprising slow speed and high speed driving elements connected to be continuously driven from the prime mover, drag clutching means normally operative for clutching the slow speed driving element to the driven element, means for varying the intensity of the drag, means for clutching the high speed driving element to the driven element, and means responsive to the reaction between said slow speed and high speed driving elements acting through their respective clutching means to reduce said drag, and further responsive to variation in load resistance acting through said high speed clutching means to effect compensating variations in said drag resistance whereby a braking resistance of substantially uniform value is maintained in stopping from high speed operation to produce an over-run of the table of a predetermined constant amount.

18. In a milling machine having a reciprocable table, a driven element continuously rotatable in one direction to effect the reciprocatory movement of the table, a prime mover, a two-speed transmission mechanism connecting the prime mover to the driven element, and means for controlling the starting and stopping of the prime mover and the shifting of said transmission mechanism in accordance with an automatic cycle including fast and slow speed movements of the table in one direction, and a fast speed return movement to initial stop position, said transmission mechanism comprising slow speed and high speed driving elements connected to be continuously driven from the prime mover, a friction clutch for operatively connecting the slow speed branch transmission to the driven element, pressure exerting means for engaging said friction clutch, means for clutching the high speed driving element to the driven element, a driving connection between said clutching means and driven element including continuously meshed complementary rotatable and axially displaceable cam tooth members, spring means acting to move said cam tooth members relatively toward each other, and means responsive to relative axial movement of said cam tooth members produced by relative rotational movement thereof to reduce the engaging pressure upon the friction clutch.

19. In a power transmission, the combination of a rotatable driven element, rotatable slow speed and high speed driving elements supported co-axially therewith, a connecting member keyed to turn with and axially movable with relation to said driven element, a friction clutch for operatively connecting the slow speed driving element with the driven element comprising a driving clutch member associated with the slow speed driving element and a cooperating driven clutch member keyed to and axially shiftable with relation to the connecting member, spring means for exerting a clutch engaging pressure upon the said latter friction clutch member, means for clutching the high speed driving element to drive the driven element, a driving connection between the high speed clutching means and the connecting member comprising a driving cam tooth member and a complementary meshing cam tooth member formed integrally with the connecting member whereby relative rotational movement of said cam tooth members will impart axial movement to the connecting member, means controlled by said axial movement within the limits of engagement of said cam teeth to reduce the engaging pressure exerted by said spring means, and additional spring means resisting said axial movement of the connecting member, said spring means being constructed and arranged to prevent full release of said friction clutch pressure and the disengagement of said cam teeth against a normal load resistance during operation of said high speed driving connections, but to permit such disengagement against an over-load resistance.

20. In a power transmission, the combination of a rotatable driven element, rotatable slow speed and high speed driving elements supported co-axially therewith, a connecting member connected to turn with and axially movable with relation to said driven element, a friction clutch for operatively connecting the slow speed driving element with the driven element comprising friction clutch members associated respectively with the connecting member and with the slow speed driving element, spring means for exerting a frictional driving pressure between said friction clutch members, said pressure being adjusted to permit slippage only against an over-load resistance imposed upon said slow speed driving connections, means controlled by axial movement of the connecting member to relieve the frictional engaging pressure exerted by said spring means, means for clutching the high speed driving element to drive the driven element including a driven high speed clutch member supported co-axially with the connecting member, said clutch member and connecting member having cam teeth continuously meshed in driving relation whereby a relative rotational movement of the connecting member and said driven clutch member produced by the clutching of the high speed driving element thereto, will force the connected member axially to relieve the frictional engaging pressure of the friction clutch members.

JOHN E. ENGLUND.